US009659737B2

(12) United States Patent
Eden et al.

(10) Patent No.: US 9,659,737 B2
(45) Date of Patent: May 23, 2017

(54) PHOSPHOR COATING FOR IRREGULAR SURFACES AND METHOD FOR CREATING PHOSPHOR COATINGS

(75) Inventors: J. Gary Eden, Champaign, IL (US); Sung-Jin Park, Champaign, IL (US); JeKwon Yoon, Paju-Si (KR); Kwang-Soo Kim, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 793 days.

(21) Appl. No.: 13/183,255

(22) Filed: Jul. 14, 2011

(65) Prior Publication Data

US 2012/0025696 A1 Feb. 2, 2012

Related U.S. Application Data

(60) Provisional application No. 61/368,955, filed on Jul. 29, 2010.

(51) Int. Cl.
*H01J 1/62* (2006.01)
*B05D 3/02* (2006.01)
(Continued)

(52) U.S. Cl.
CPC .............. *H01J 29/20* (2013.01); *H01J 9/222* (2013.01); *H01J 61/44* (2013.01); *Y10T 428/24421* (2015.01)

(58) Field of Classification Search
CPC ............. H01J 29/20; H01J 61/44; H01J 9/222
(Continued)

(56) References Cited

U.S. PATENT DOCUMENTS 2,857,541 A 10/1958 Etzel et al.
3,551,303 A 12/1970 Suzuki et al.
(Continued)

FOREIGN PATENT DOCUMENTS

WO WO 2007-087285 8/2007
WO WO 2008-013820 1/2008

OTHER PUBLICATIONS

Eden, J. Gary, et. al., "Arrays of nonequalibrium plasmas confined to microcavities: an emerging frontier in plasma science and its applications", *Plasma Sources Sci. Technol.*, 15, 2006.
(Continued)

*Primary Examiner* — Joseph L Williams
(74) *Attorney, Agent, or Firm* — Greer, Burns & Crain, Ltd.

(57) ABSTRACT

Microstructured, irregular surfaces pose special challenges but coatings of the invention can uniformly coat irregular and microstructured surfaces with one or more thin layers of phosphor. Preferred embodiment coatings are used in microcavity plasma devices and the substrate is, for example, a device electrode with a patterned and microstructured dielectric surface. A method for forming a thin encapsulated phosphor coating of the invention applies a uniform paste of metal or polymer layer to the substrate. In another embodiment, a low temperature melting point metal is deposited on the substrate. Polymer particles are deposited on a metal layer, or a mixture of a phosphor particles and a solvent are deposited onto the uniform glass, metal or polymer layer. Sequential soft and hard baking with temperatures controlled to drive off the solvent will then soften or melt the lowest melting point constituents of the glass, metal or polymer layer, partially or fully embed the phosphor particles into glass, polymer, or metal layers, which partially or
(Continued)

fully encapsulate the phosphor particles and/or serve to anchor the particles to a surface.

23 Claims, 16 Drawing Sheets

(51) Int. Cl.

| | |
|---|---|
| ***B32B 17/00*** | (2006.01) |
| ***H01J 29/20*** | (2006.01) |
| ***H01J 9/22*** | (2006.01) |
| ***H01J 61/44*** | (2006.01) |

(58) Field of Classification Search

IPC .......... C09K 11/025,11/02, 11/06, 11/00; H01L 2924/00, 2224/48091, 2924/00014, 2224/48247, 2224/73265, 33/502, 2924/0002, 2224/32245, 33/501, 2224/48472, 33/56, 2224/48257, 33/507, 2933/0041, 33/505, 2224/45144, 2224/49107, 33/504, 2224/48227, 2224/8592, 2924/10253, 2924/12041, 2933/0091, 31/02322, 31/055, 33/005, 33/54

See application file for complete search history.

(56) References Cited

U.S. PATENT DOCUMENTS

| | | | | |
|---|---|---|---|---|
| 5,441,627 | A | 8/1995 | Kato et al. | |
| 6,439,943 | B1 * | 8/2002 | Aoki et al. | 445/24 |
| 6,695,664 | B2 | 2/2004 | Eden et al. | |
| 6,815,891 | B2 | 11/2004 | Eden et al. | |
| 6,867,548 | B2 | 3/2005 | Eden et al. | |
| 7,112,918 | B2 | 9/2006 | Eden et al. | |
| 7,297,041 | B2 | 11/2007 | Eden et al. | |
| 7,385,350 | B2 | 6/2008 | Eden et al. | |
| 7,477,017 | B2 | 1/2009 | Eden et al. | |
| 7,511,426 | B2 | 3/2009 | Eden et al. | |
| 7,573,202 | B2 | 8/2009 | Eden et al. | |
| 7,615,926 | B2 | 11/2009 | Eden et al. | |
| 7,638,937 | B2 | 12/2009 | Eden et al. | |
| 8,004,017 | B2 | 8/2011 | Eden et al. | |
| 2003/0080664 | A1 | 5/2003 | Eden et al. | |
| 2003/0080688 | A1 | 5/2003 | Eden et al. | |
| 2003/0132693 | A1 | 7/2003 | Eden et al. | |
| 2004/0160162 | A1 | 8/2004 | Eden et al. | |
| 2005/0136609 | A1 | 6/2005 | Mosley et al. | |
| 2005/0148270 | A1 | 7/2005 | Eden et al. | |
| 2006/0038490 | A1 | 2/2006 | Eden et al. | |
| 2006/0082319 | A1 | 4/2006 | Eden et al. | |
| 2006/0127670 | A1 * | 6/2006 | Kinlen et al. | 428/403 |
| 2008/0119105 | A1 | 5/2008 | Eden et al. | |
| 2008/0129185 | A1 * | 6/2008 | Eden et al. | 313/485 |
| 2008/0185579 | A1 | 8/2008 | Eden et al. | |
| 2008/0238298 | A1 * | 10/2008 | Asai et al. | 313/503 |
| 2009/0091237 | A1 * | 4/2009 | Hirosaki et al. | 313/495 |
| 2010/0001629 | A1 | 1/2010 | Eden et al. | |
| 2010/0072893 | A1 | 3/2010 | Eden et al. | |
| 2010/0213450 | A1 * | 8/2010 | Satoh et al. | 257/40 |
| 2010/0245218 | A1 * | 9/2010 | Nasu et al. | 345/80 |
| 2011/0109224 | A1 | 5/2011 | Eden et al. | |
| 2011/0148282 | A1 | 6/2011 | Eden et al. | |

OTHER PUBLICATIONS

Masuda, Hideki, et. al. "Ordered Metal Nanohole Arrays Made by a Two-Step Replication of Honeycomb Structures of Anodic Alumina", *Science*, New Series, vol. 268, No. 5216 Jun. 9, 1995.

Park, S-J. et. al., "Flexible microdischarge arrays: Metal/polymer devices", *Applied Physics Letters*, vol. 77, No. 2, Jul. 10, 2000.

Park, S-J. et. al., "Nanoporous alumina as a dielectric for microcavity plasma devices: Multilayer A1/A1$_2$ O$_3$ structures", *Applied Physics Letters*, vol. 86, 2005.

Park, S-J. et. al., Lightining from thin (,1mm) sheets of microcavity plasma arrays fabricated in A1/A1$_2$ O$_3$ glass structures: planar, mercury-free lamps with radiating areas beyond 200cm$^2$ , *J. Phys. D.: Appl. Phys*, 40, 2007.

Tarighat, R., et. al. "Realization of Flexible Plamsa Display Panels on PET Substrates", *Proceeding of the IEEE*, vol. 93, No. 7, Jul. 2005.

* cited by examiner 10
12

10
SOFT BAKING
16
12

10
HARD (RAMP) BAKING
20
18

10
22
18

10

10
12

10
HARD (RAMP) BAKING
14

10
16
14

10
HARD (RAMP) BAKING
20
18

10
18
22

10

FIG. 1L
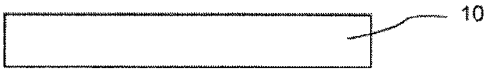
FIG. 1M
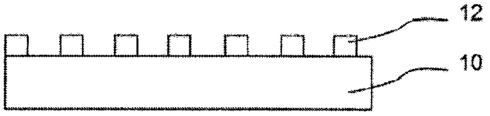
FIG. 1N
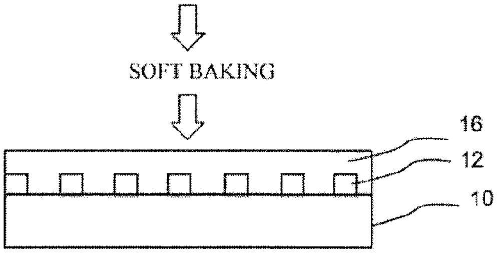
FIG. 1O
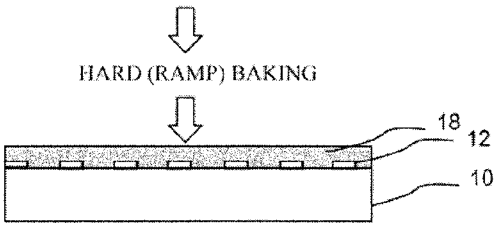
FIG. 1P
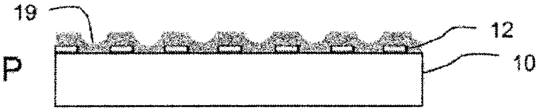
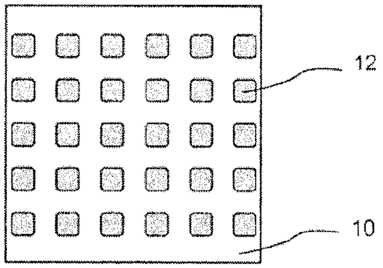
FIG. 1Q
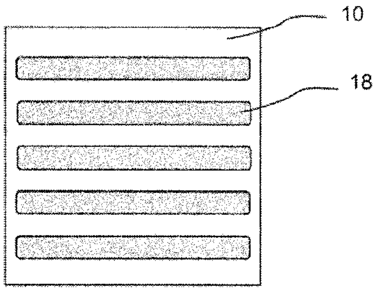
FIG. 1R 10a
11b
10
10b
11b

10

12
Soft Baking
Screen Printing or Spray of phosphors (FIG. 1C)
Ramp Baking 18
10

18
10

PHOSPHOR COATING FOR IRREGULAR SURFACES AND METHOD FOR CREATING PHOSPHOR COATINGS

CLAIM FOR PRIORITY AND REFERENCE TO RELATED APPLICATION

This application claims priority under 35 U.S.C. §119 from co-pending provisional application Ser. No. 61/368,955, which was filed on Jul. 29, 2010.

STATEMENT OF GOVERNMENT INTEREST

This invention was made with government support under Contract No. FA9550-07-1-0003 awarded by United States Air Force Office of Scientific Research. The government has certain rights in the invention.

FIELD

Fields of the invention include phosphors and devices that incorporate phosphors. Preferred applications of the invention are to light-emitting devices and particularly to microcavity plasma devices (also referred to as microplasma devices or microdischarge devices) having microstructured or inclined surfaces that are difficult to coat uniformly with phosphor.

BACKGROUND

Phosphors are compounds that exhibit a sustained glow (phosphorescence) in response to the absorption of an energized particle, such as an electron or a photon. The sustained glow results from the ability of a phosphor material to store energy for a period of time before re-emitting it. Phosphors are a fundamental component in countless display devices, light sources, and other devices, including safety equipment and novelty items. For example, phosphors are indispensable in producing white light or light of various colors from displays and lighting sources. There are a large number of phosphor compounds that have well established color responses and persistence, i.e., the duration of glow after excitation. Phosphors are chosen for particular applications based upon color response (emission spectrum) and persistence.

Phosphor coatings have been studied widely, and are applied in different thicknesses on the surfaces of various materials. Phosphor films have been applied to glass and other surfaces for many years. Several past efforts have mixed phosphor materials with glass or plastic, but the formation methods and resulting layers have limited application. A few patents have provided processes for preparing layers of phosphors embedded in materials such as glass. One example is U.S. Pat. No. 2,857,541 which describes a method for producing a thin layer of phosphor-embedded glass by mixing powdered glass and phosphor with an electrolyte and water to form a slurry. From the resulting green plaque, layers having a minimal thickness on the order of 2 mm are realized. Such a formation method and the resultant phosphor-embedded glass slab are not amenable to uniformly coating phosphor onto microstructured and irregular surfaces.

Roohollah S. Targhatr, et al., "Realization of Flexible Plasma Display Panels on PET Substrates," Proceedings of the IEEE, VOL. 93, NO. 7, July 2005, proposes a flexible plasma display that has a top polyethylene terephtalate (PET) substrate with phosphor grains that are blast-embedded into the PET substrate. The blasting of phosphor particles embeds the phosphor particles into PET craters. In a variation, vertical etching is used to form craters on the top substrate via a photo-chemical reaction which yields a vertical and sharp etching of squares, and the particles are then deposited into the craters. The top PET layer with phosphor acts to convert vacuum ultraviolet (VUV) radiation into visible light.

Any process for preparing thin phosphor films of precisely controlled thickness and efficient in generating light, should account for several factors. If the purpose of the phosphor is to convert short wavelength (ultraviolet) radiation into visible light, it is important to distinguish phosphor layers photoexcited by VUV radiation (wavelengths less than approximately 200 nm) from phosphors intended to be illuminated by longer-wavelength ultraviolet light (200-400 nm, in the so-called UV A,B, and C regions). The reason for the distinction is that VUV photons are strongly absorbed by virtually all materials in which one might embed a phosphor. Consequently, it is preferable that phosphors intended for illumination by VUV light are exposed directly to the incoming radiation. Inserting most materials between the phosphor and the VUV source will result in some or most of the VUV photons being absorbed by said material and, thus, never reaching the phosphor. On the other hand, if it is intended that longer wavelength ($\lambda \geq 250$ nm) photons excite the phosphor, one has greater freedom in inserting a thin layer of one or more materials between the UV source and the phosphor because a greater variety of materials transmit efficiently in this range of wavelengths. In summary, the use of binders, glasses, or other materials to encapsulate or partially shield the phosphor is undesirable if the phosphor is to be "driven" by VUV photons. However, even if the intent is to illuminate the phosphor with photons having wavelengths above 200 nm, it is desirable to minimize the thickness of any encapsulating materials because the absorption (and reflection) of light is not zero for even the best materials.

Another consideration important to forming phosphor layers is that phosphors are generally large molecules that can be damaged if the method of depositing the layers is overly aggressive physically or chemically. Therefore, the blast embedding of phosphors into a surface is not desirable, and experience has shown that phosphor particle sizes in the 1-10 μm range are preferable.

Microcavity plasma devices and arrays have been developed and advanced by researchers at the University of Illinois, including inventors of this application. Devices and arrays have been fabricated in different materials, such as ceramics and semiconductors. Arrays of microcavity devices have been fabricated in thin metal and metal oxide sheets. Advantageously, microcavity plasma devices confine the plasma in cavities having microscopic dimensions and require no ballast, reflector or heavy metal housing. Microcavities in such devices can have different cross-sectional shapes, but generally confine plasma in a cavity having a characteristic dimension in the range of about 5 μm to 500 μm.

Applying uniform layers of phosphors to the surfaces of microcavity devices or other irregular surfaces is often challenging. Arrays of microcavities, in particular, often have inclined or spatially modulated surfaces with considerable microstructure that can include steps or gratings, not to mention the microcavities themselves. Applying a phosphor film to the interior surface of fluorescent light tubes has been a part of the manufacturing process for years but the surface to be coated is reasonably smooth and no effort is made to encapsulate the phosphor particles. Furthermore, the phosphor layer formation process often involves water which, if not removed completely from the phosphor in subsequent processing (baking, de-gassing), will adversely impact the performance and lifetime of the lamp.

The present invention addresses the need for a method to uniformly coat irregular and microstructured surfaces with one or more thin layers of phosphor. In addition, the individual phosphor particles can be coated by, or partially or wholly encapsulated (in a glass or other material), thereby protecting the phosphor from the microplasma or vice-versa.

SUMMARY OF THE INVENTION

Methods of the invention can provide a thin (sub-200 μm) layer of phosphor that is fully or partially embedded in glass. Methods of the present invention can form thin layers of phosphors in glass, but provide the capability to do so on three dimensional (stereoscopic) structures having a high degree of surface relief, including microstructured and inclined surfaces. The thickness of the layers is typically no greater than 20 μm and the method of the invention is s capable of coating complex structures (such as wire meshes and grids) and disparate materials (including nanoporous aluminum oxide and glass).

A preferred embodiment of the present invention is a thin encapsulated phosphor coating on a substrate. The coating typically includes a glass, metal or polymer film having a substantially uniform thickness of ~1-~20 μm and phosphor particles having diameters in the range of ~1 to ~10 μm. The phosphor particles are at least partially encapsulated by the glass, metal or polymer film. Microstructured, irregular surfaces pose special challenges but coatings of the invention can uniformly coat irregular and microstructured surfaces with one or more thin layers of phosphor. Preferred embodiment coatings are used in microcavity plasma devices and the substrate is, for example, a device electrode with a patterned and microstructured dielectric surface.

A method for forming a thin encapsulated phosphor coating of the invention applies a uniform paste of glass or polymer layer to the substrate. In another embodiment, a low temperature melting point metal is deposited on the substrate. Polymer particles are deposited on a metal layer, or a mixture of a phosphor particles and a solvent are deposited onto the uniform glass or polymer layer. Sequential soft and hard baking with temperatures controlled to drive off the solvent will then soften or melt the lowest melting point constituents of the glass or polymer layer, partially or fully embed the phosphor particles into glass, polymer, or metal layers, which partially or fully encapsulate the phosphor particles and/or serve to anchor the particles to a surface.

BRIEF DESCRIPTION OF THE DRAWINGS

FIGS. 1A-1R, are cross-sectional diagrams illustrating three preferred embodiment methods for forming thin, partially or fully encapsulated, layers of phosphor on an irregular surface, and FIGS. 1Q & 1R are schematic top view;

DETAILED DESCRIPTION OF THE PREFERRED EMBODIMENTS

Figures 1A, 1B, 1C, 1D, 1E:
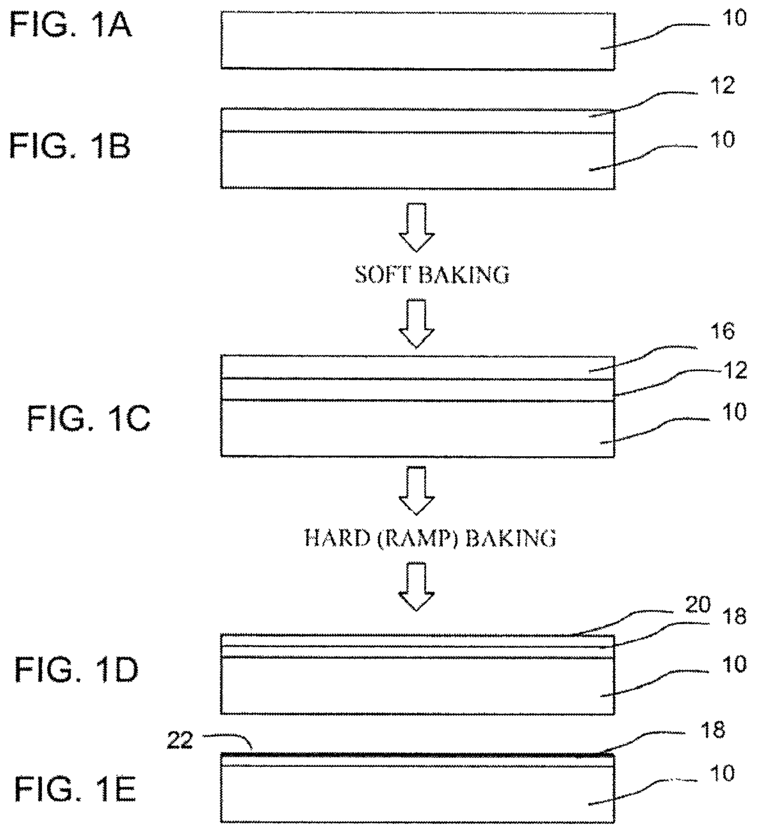

Above mentioned prior methods have provided phosphor coating methods suitable for coating regular, flat horizontal surfaces typically with thick phosphor layers. The '541 patent mentioned above, for example, provides a formation method and resultant phosphor-embedded glass slab that are not amenable to uniformly coating phosphor in a thin layer onto microstructured and irregular surfaces. Microstructured, irregular surface pose special challenges. The present invention provides methods to uniformly coat such irregular and microstructured surfaces with one or more thin layers of phosphor. In addition, the individual phosphor particles can be coated by, or encapsulated in, glass or polymer, thereby protecting the phosphor from the microplasma or vice-versa. Another preferred embodiment of the invention provides a thin layer of a low melting point metal (such as In) into which phosphor particles may be anchored. The phosphor particles anchored in metal can also be partially or fully embedded in think glass or polymer.

Methods of the invention are capable, for example, of forming thin layers of phosphors partially or fully encapsulated in glass or polymer on three dimensional (stereoscopic) structures having a high degree of surface relief, including microstructured and inclined surfaces. Preferred methods and resultant coatings can be very thin, e.g., a typical thickness is no greater than 20 μm, and preferably no greater than ~5 μm in preferred embodiments, with partially or fully encapsulated phosphor particles having diameters in the range of ~1-7 μm. The method of the invention is capable of coating complex structures (such as wire meshes and grids) and materials with irregular surfaces (including nanoporous aluminum oxide and nanoporous titanium oxide).

Applying uniform layers of phosphors to the surfaces of microcavity devices or other irregular surfaces is challenging, but is readily accomplished with phosphor coatings and coating methods of the invention. Arrays of microcavities, in particular, often have inclined or spatially modulated surfaces with considerable microstructure which can include steps or gratings, not to mention the microcavities themselves. The invention provides phosphor particles enclosed in a thin glass or polymer layer that can be applied onto virtually any underlying substrate having a microstructured and/or irregular surface. Phosphor layers as thin as 1-10 μm in thickness can be deposited uniformly on a variety of substrates through a combination of solution deposition and baking processes. In preferred embodiment methods of forming a phosphor coating, a thin layer of glass paste or polymer is deposited onto the surface of interest, followed by deposition of phosphor or a phosphor paste. Sequential baking steps are conducted at temperatures controlled such that the underlying glass (or polymer) is softened, resulting in the partial or complete embedding and, therefore, encapsulation of phosphor particles in the underlying glass or polymer film. Rather than pre-mixing the glass or polymer and phosphor, this sequential process deposits separately the constituents of the desired layer and then embeds the phosphor particles while maintaining the integrity of the phosphor particles and the resultant glass or polymer layer that partially or fully encapsulates the particles. Such an approach is well-suited to irregular surfaces because the microstructures and irregular features (including cavities) are first covered by a conformal glass or polymer film. Unimpeded by the presence of phosphor particles, the glass or polymer paste is able to flow into cavities, trenches and other features to yield a uniform film. Paste, as defined herein, means that the glass or polymer has a viscosity that permits flow during deposition to form a uniform film on surfaces that are inclined or irregular. Viscosities in the range of 10 to 10000 centipoise (cps) interval are preferred, and viscosities in the range of 500-1000 centipoise are most preferred.

Temperature and the viscosity of the glass paste or polymer are controlled so as to ensure that inclined surfaces are also coated uniformly (i.e., without dripping or thickening at the base of an inclined surface). Subsequently, the phosphor is introduced with the glass or polymer film in place. Therefore, this invention decouples the introduction of phosphor into the glass (or polymer) from the process of applying a glass layer in a conformal manner to an irregular surface. Preferred formation methods of the invention use spin coating and baking steps that are inexpensive and readily integrated into a manufacturing environment. A thin glass or polymer layer, including embedded phosphor particles of the invention, can now be formed as a coating on various substrates, such as aluminum or nanoporous alumina ($Al_2O_3$), which, in the past, have posed challenges to forming phosphor layers of uniform thickness and particularly if the surface was irregular, tilted, or microstructured.

The invention also provides microcavity plasma devices, and arrays of microcavity plasma devices, that include a thin glass or polymer layer having fully or partially encapsulated phosphors that are positioned to be excited by VUV or UV emissions from the microcavity plasma device or array of microcavity plasma devices. Particular preferred embodiments include a thin glass layer, which has been demonstrated experimentally to provide excellent structural benefits in addition to protection of the phosphor from the plasma. In preferred embodiments in which the intention is to photoexcite phosphors with longer wavelength (UV A-C) light, the phosphor particles are fully encapsulated in a thin glass layer that protects the phosphor from damage by the plasma produced in the microcavity plasma device(s). Conversely, the plasma is protected from outgassing by the phosphor. Testing of exemplary experimental arrays of microcavity devices of the invention has shown substantial improvement of their optical properties as compared to those for similar devices having phosphors that are exposed directly to plasma. Another preferred embodiment of the invention concerns the excitation of phosphors with VUV light. In this instance, it is advantageous to not fully encapsulate the phosphor particles because the coating itself may absorb a substantial fraction of the VUV photons. Rather, the invention provides a thin layer of a low melting temperature metal which is able to anchor the phosphor particles and, if desired, serve as an additional electrode. A subsequent layer of glass to partially encapsulate the phosphor may also be used.

Preferred embodiments of the invention will now be discussed with respect to the drawings. The drawings include schematic representations that will be understood by artisans in view of the general knowledge in the art and the description that follows. Features may be exaggerated in the drawings for emphasis, and features may not be to scale. Artisans will recognize broader aspects of the invention from the description of the preferred embodiments.

Figures 1F, 1G, 1H, 1I, 1J, 1K:
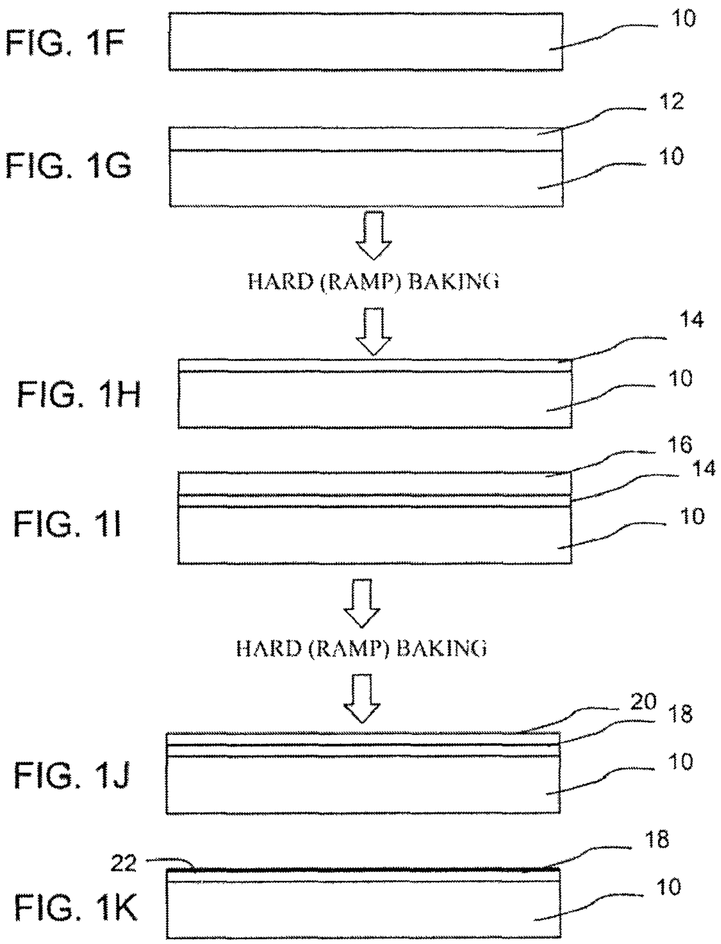

FIGS. 1A-1R illustrate three preferred embodiment methods for forming thin, partially or fully encapsulated, layers of phosphor with phosphor particles that are partially or fully embedded into a glass paste or polymer during the formation process. In the preferred embodiments of FIG. 1, thin layers of phosphor are formed with partially or completely encapsulated phosphor particles in a glass layer, and the layer can be bonded to the surface of a substrate 10 such as glass, aluminum with an $Al_2O_3$ film, or a ceramic.

In a first process of FIGS. 1A-1E, a substrate 10 is provided in FIG. 1A. FIG. 1B entails applying a thin film of glass paste 12 to the surface of the substrate 10. Layer thicknesses between 1 and 20 μm have been demonstrated experimentally, with a typical preferred thickness of 5 μm. Partially or completely encapsulated phosphor particles have diameters in the range of ~1 to ~10 μm. The film of glass or polymer paste can be applied by any of several processes, including dipping or spraying but depositing layers of uniform thickness within cavities, trenches, or other structures in the surface (not shown in FIG. 1) requires control over the paste viscosity which will typically lie in the 10 to 10000 centipoise (cps) interval. Most of the experimental results to date have been obtained with glass paste viscosities of 500-1000 centipoise.

Dipping or spraying is effective for various glass pastes but the specific paste adopted for tests to date is a mixture of $B_2O_3$, MgO, ZnO, $TiO_2$, $Al_2O_3$, $SiO_2$ and $Bi_2O_3$. The latter serves a function similar to that for PbO but allows for a lead-free seal to be made to the substrate. After a film of glass paste having the desired thickness has been applied to the substrate surface, the film 12 and substrate 10 are "soft baked" in air or $N_2$ at 150° C. The baking serves to adhere the film 12 to the substrate and the time period for this baking step was about one hour.

The next step in the process, in FIG. 1C, is to apply, atop the glass paste film, a layer of phosphor 16 having a nominal thickness (depending on the intended application) of 20 μm. Typical phosphors used in experiments to date have an average particle size of 5 μm and are combined with a solvent. A typical solvent in tests to date was a mixture of Butyl Carbitol Acetate, α-Terpineol, and ethyl cellulose or polyvinyl butyral as a binder. The latter component is determined by the identity of the glass paste and its thickness. This phosphor/solvent mixture can also applied by a screen printing, dipping or spraying procedure, both of which are inexpensive and amenable to the processing of large surface areas (>$m^2$).

Suitable example phosphors and those typically employed in experiments conducted to date include (Y,Gd)$BO_3$:Eu (red), Eu:$Y_2O_3$ (red), $LaPO_4$:Ce,Tb (green), $Zn_2SiO_4$:Mn (green), and BAM ($BaMgAl_{14}O_{23}$:Eu or $BaMgAl_{10}O_{17}$:Eu) for blue. The desired thickness of the phosphor/solvent mixture is dependent upon the wavelength of the ultraviolet light with which the phosphors are excited. In a lamp, for example, based on Xe gas in which the predominant emitter is $Xe_2$ (which produces peak emission at $\lambda \approx 172$ nm), it is desirable to maintain the phosphor film thickness below 10 μm because of the phosphor absorption coefficient in this wavelength region. When photoexciting the phosphor at longer UV wavelengths (such as 300 nm or 350 nm), the phosphor layer can generally be made thicker so as to efficiently absorb most or all of the incoming UV radiation. To produce a thicker phosphor layer, the deposition process can be repeated.

After applying the phosphor/solvent layer, the substrate 10 and films 12, 16 are, again, soft-baked. Example suitable soft bake conditions used in experiments were 150° C. for about one hour in air or $N_2$. The soft-bake is followed by a "hard bake" ramp procedure. The hard baking ramp procedure involves slowly ramping the temperature to a higher temperature that can vaporize the organic solvents contained in both films on the substrate. An example suitable temperature in experiments for the solvents used was approximately 250° C. for approximately one hour. After this one hour period, the temperature is increased again to a value that can soften or melt the lowest melting point constituents of the glass or polymer layer 12, thereby resulting in the partial or complete embedding and, therefore, encapsulation of phosphor particles in the glass or polymer layer 12, as seen in FIG. 1D to form a partially or completely embedded polymer layer 16. In tests to date, a typical hard bake was in the 450-550° C. interval (typically 480-500° C.) and the temperature was again maintained for approximately one hour. Increasing the baking temperature and/or the baking time during the partial or complete embedding baking step significantly beyond the temperature and time necessary to soften or melt the lowest melting point constituents of the glass or polymer layer 12 is preferably avoided because this will likely degrade the phosphor. The high melting point constituents of the glass or polymer layer (such as $Al_2O_3$) are, of course, not melted during the hard baking process. Rather, the function of such particles is to provide mechanical support for the phosphor particles and to discourage their lateral movement. The entire time required by the formation process can be 8-12 hours, depending upon the surface area of the substrate.

Excess phosphor particles 20, also shown in FIG. 1D, are typically left on the surface of the glass or polymer encapsulated phosphor layer 18 that results from the formation process. In FIG. 1E, any excess phosphor particles are easily removed from the surface of the glass or polymer encapsulated phosphor layer by directing a stream of gas across the surface. Alternatively, the excess phosphor particles 20 can be overcoated, such as with an additional thin film 22 of glass or polymer, another dielectric (such as $TiO_2$), or a polymer. The thickness of such an overcoating layer 22 (if desired) is preferably no more than a few micrometers.

The encapsulated phosphor layer 18 resulting from this procedure is much more mechanically robust compared to phosphor films typically applied to the interior of fluorescent lamps, for example. The loss of phosphor in such devices which are coated by conventional means is often significant and deleterious to lamp performance. The method of the present invention yields uniform films of glass or polymer-encapsulated phosphor particles, even if the surface of the substrate 10 is steeply inclined, includes inclined features, includes surface irregularities, and/or is punctuated with cavities and/or trenches.

FIGS. 1F-1K illustrate a variation of the FIG. 1A-1E method, and common reference numbers are used. The substrate 10 is again provided (FIG. 1F), but in this case is a substrate such as aluminum layer, foil, or plate onto which nanoporous alumina ($Al_2O_3$) has been grown. After a layer of glass paste and solvent 12 is deposited by any of several processes (spin coating, spraying, etc.) onto substrate 10 (FIG. 1B), the layer and its substrate are hard-baked to yield the solid glass layer 14 (FIG. 1C). Typical thicknesses of the solid glass layer 14 are in the 1-10 μm range. The temperature of the hard bake is dependent upon the nature of the substrate 10 and paste but will, in general, be similar to those mentioned previously in connection with the hard bake procedure of FIGS. 1A-1E. As one example, a suitable substrate 10 is an aluminum layer, foil, or plate onto which nanoporous alumina ($Al_2O_3$) has been grown (for example, by converting at least a portion of the Al substrate into $Al_2O_3$). Tests to date with Al foil substrates typically 100-250 μm in thickness have involved a spin-coated glass paste layer 5-10 μm in thickness which is normally baked at 550° C. for 30-60 minutes. The remainder of the process is similar to FIGS. 1A-1E. A liquid mixture of the desired phosphor and a solvent is applied to the surface of glass layer 14 in FIG. 1I. Exemplary solvents necessary to dilute the phosphor paste to an acceptable viscosity include 2 (2-n-Butoxyethoxy)ethyl acetate, α-Terpineol and/or isopropyl alcohol. Phosphor particles 1-10 μm in diameter are preferred and the diameter of the particles dictate the thickness of the phosphor layer. The phosphor paste 16 application process may be repeated if additional thickness of the phosphor layer is desired. After hard-baking to form the phosphor paste layer 18, excess phosphor particles 20 are removed by a gas stream or overcoated, as described previously.

FIGS. 1L-1R illustrates a process for forming a thin phosphor layer atop a glass layer that is not continuous but, rather, patterned. In FIG. 1M islands of glass paste 12 have been deposited on the substrate 10 by any of a number of processes, including screen printing. Viewed from above (FIGS. 1Q and 1R), the islands generally are arranged into a pattern (array) and each island can be produced to have virtually any geometry (such as lines (FIG. 1R, microsquares (FIG. 1Q), or diamonds, hexagons, etc.). Following soft-baking of the islands/substrate structure, the phosphor paste layer 16 is applied, as before in FIG. 1N. Hard baking of layer 16 yields a durable phosphor/glass mixture coating 18 (FIG. 1O) which often exhibits depressions 19 in the regions between the glass islands as shown in FIG. 1P. The depth of the depressions 19 is controlled by the height of the glass paste islands 12 in FIG. 1M, the spacing between the islands and the length of the hard-baking process. These "depressions" are considered to be distinct from cavities and is an indentation in the surface in which the maximum depth of the indentation L is less than one-tenth of its width at the surface. The topography of the phosphor surface in FIG. 1P is advantageous to several lighting and display applications. Tests conducted to date show clearly that phosphor layers 18 in the fabrication processes of FIG. 1 can be formed to a thickness of, for example, 10 μm with a variation in thickness of no more than ±2 μm over an entire surface >200 $cm^2$ in area. Uniformity is an essential attribute for lighting applications, in particular.

FIGS. 2A-2E illustrate a particular application of the fabrication process of FIGS. 1A-1E to uniformly coating a substrate 10 including structured surface 10*a*. Identical and similar reference numerals are used to indicate corresponding parts in FIGS. 2A-2E. The structured surface 10*a* in the example of FIG. 2A has microcavities 11*a* and in the example of FIG. 2B has hemispherical projections 11*b*, In FIG. 2C the structured surface 10*a* is coated with a glass paste 12 (or polymer) layer by spraying a solution of the appropriate viscosity as in FIG. 1B. Following soft-baking of the glass or polymer/substrate structure to at least partially remove the organic binder from the glass layer 12, a phosphor paste layer is applied (as in FIG. 1C) to the surface by spraying or screen printing. High temperature/ramp baking then completes the process to form the layer 18 of partially or fully embedded polymers, as in FIGS. 1D and 1E.

For those photonic devices (such as lamps) requiring the conversion of UV light into the visible, preferred arrays of microcavity plasma devices of the invention (such as in FIGS. 2A and 2D) are an improvement upon metal and metal oxide arrays of microcavity plasma devices such as those disclosed in Eden et al., U.S. Published Patent Application No. 20070170866, entitled "Arrays of Microcavity Plasma Devices with Dielectric Encapsulated Electrodes," which was published on Jul. 26, 2007; and in Eden et al., US. Published Patent Application No. 20060082319, entitled "Metal/Dielectric Multilayer Microdischarge Devices and Arrays," which was published on Apr. 20, 2006. The phosphor coating procedure described above is effective for a wide range of surfaces, including aluminum oxide on aluminum and ceramic substrates.

Figures 3A, 3B, 3C:
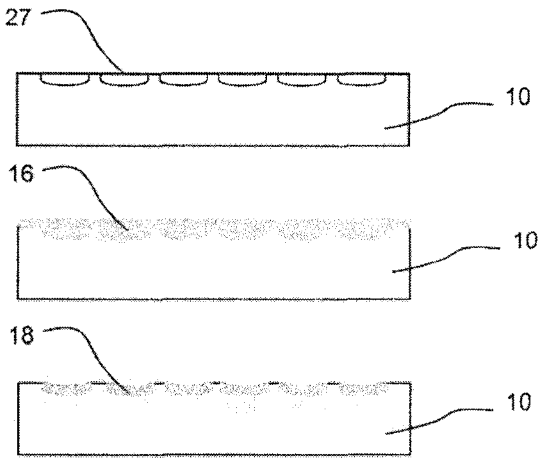
FIGS. 3A-3C are schematic diagrams in cross-section of another preferred embodiment method for producing a thin layer of partially or fully encapsulated phosphor particles within depressions or cavities in a substrate.

FIGS. 3A-3C are cross-sectional diagrams illustrating application of a phosphor/glass (or polymer) layer 18 within depressions or cavities 27 formed in substrate 10. Using the process of FIGS. 1A-1E, the cavities 27 can be partially or fully filled with a phosphor layer 18. Depending upon the geometry (depth, width, etc.) of the cavities 10 and the thickness of the applied glass paste and phosphor paste layers, the surface of the final phosphor layer 18 may be flush with the surface of 10 or not, as desired.

Figure 4A:
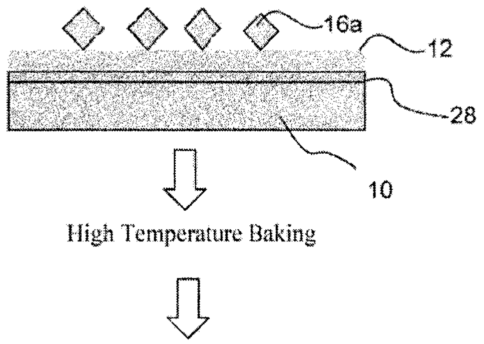
FIGS. 4A and 4B are cross-sectional diagrams illustrating a preferred method for anchoring phosphor particles in a thin metal film with a glass film overcoat.
Figure 4B:
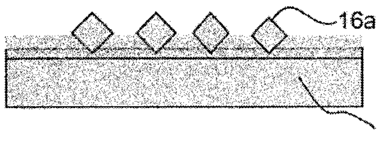

For applications in which the intention is to excite a phosphor with VUV ($\lambda \leq 200$ nm) photons (or, indeed any UV wavelength which is unable to pass efficiently through a glass or polymer coating), it is advantageous to only partially embed and not fully coat the phosphor particles. This can be achieved with the processes already described using polymers and glasses to partially embed the phosphors. Phosphor particles can also be anchored to a metal layer and be left partially exposed by an even thinner glass or polymer layer or left anchored by the metal layer itself. FIGS. 4A and 4B illustrate a process for anchoring phosphors to a metal layer. The process is similar to the previously described processes, and like reference numbers are used in FIGS. 4A and 4A. In the process of FIGS. 4A and 4B, a thin metal layer 28 is first deposited onto the substrate 10 prior to deposition of a glass/polymer layer 12, soft baking and deposition of phosphor particles. The thin metal layer includes metal (or a metal mixture) having a low melting point (e.g., <400° C.), such as In, Tl, Pb, Sn, or Zn. This metal layer is thin with a thickness of typically 2 μm or less, and the layer can be deposited by evaporation, sputtering, or other process. If desired, a layer of glass paste is subsequently also deposited as shown in FIG. 4A, but this can be omitted. After the metal layer formation/glass layer, then phosphor particles 16*a* (not a paste but the particles alone) are distributed onto the surface. During the process of hard/ramp baking this structure, the phosphor particles sink into the underlying two layers and anchor themselves in the metal layer 28. If used, finished layer of glass 18 above the metal layer 28 has a thickness such that it will not completely cover the phosphor particles 16*a*, but instead serves to partially surround the sides of the phosphor particles and further stabilize their positions. The glass/polymer layer 12 makes the layer more robust, but this glass/polymer layer is optional. The metal layer 28 can also serve as an electrode for lighting or display devices.

Figure 5A:
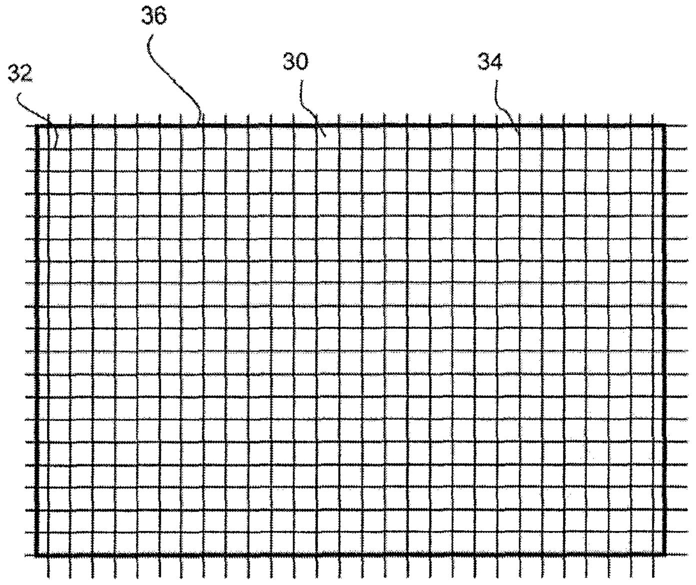
FIGS. 5A and 5B are schematic top and cross-sectional diagrams that show an exemplary array of metal/metal oxide microcavity plasma devices having a wire or mesh electrode that is coated with a glass-encapsulated phosphor layer.
Figure 5B:
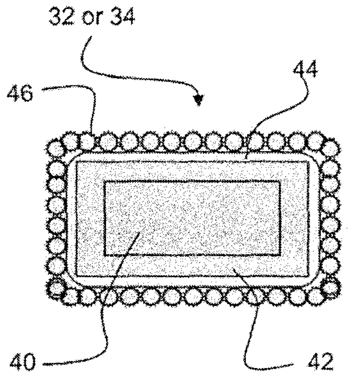

FIGS. 5A and 5B show an example array of microcavity plasma devices having at least one electrode that is coated with glass or polymer encapsulated phosphor. FIG. 5A is a schematic diagram in plan view showing microcavities 30 that have within them discharge gas(es) or vapor(s) or mixtures thereof, and a plasma is generated when a time-varying voltage of the proper magnitude is applied between electrodes 32 and 34 that together define a given microcavity 30 in the array. The electrodes 32, 34 can be formed from a wire mesh or screen that is anodized to create a thin metal oxide layer on the surface of the metal which enables thin microcavity plasma device arrays with individually addressed microcavities. That is, electrodes 32 and 34 are electrically isolated from each other by the oxide formed on each by anodization. The depth of the microcavities 30 approximates the thickness of the anodized wire mesh of electrodes 32 and 34. The array can be sealed with a packaging layer 36, such as a thin glass, polymer, etc. packaging layer that creates minimal additional thickness. With application of an appropriate time varying voltage, the electrodes 32 and 34 drive and sustain plasma formation in the microcavities 30. Such an array of microplasmas is made possible by the growth of oxide over the metal, thereby electrically isolating every conducting column and row in the array of electrodes from every other column and row.

FIG. 5B shows a detailed cross-section of a portion of one of the electrodes 32 or 34. A conductor 40 is the metal core remaining of a rectangular cross-section conductor that has been partially converted into metal oxide 42 by an anodization process. A thin glass or polymer layer 44 and partially or fully embedded phosphor particles 46 complete the electrode 32 or 34. The glass or polymer layer can also serve as a protective layer or sealant to fill and/or seal microscopic cracks or imperfections at the surface or edge of the metal oxide layer grown by the anodization process. Such imperfections are most likely to be formed when the aluminum surface on which the oxide is grown has a small radius of curvature. Example experimental arrays were formed in accordance with FIGS. 5A and 5B. In an exemplary experimental array, the thin layer of phosphor 46 comprised particles ~1-7 μm in diameter and partially embedded into a ~10 μm thick glass film 44. The metal oxide 42 in the experimental arrays was a ~10-30 μm thick layer of $Al_2O_3$ formed by the partial anodization of an aluminum mesh that formed the conductors 32 and 34 of the arrays. The cross-section of conductor 40 need not be rectangular as illustrated in FIG. 5B but may be one of a number of different shapes.

The microcavities 30 can be any of a wide variety of geometries. The cavities can be shaped according to commercial wire mesh that is available in different shapes, or can be formed by any of a number microfabrication processes from a solid foil. Anodization creates the metal oxide, and then the glass and phosphor are deposited according to the methods discussed above with respect to FIG. 1.

Figure 6A:
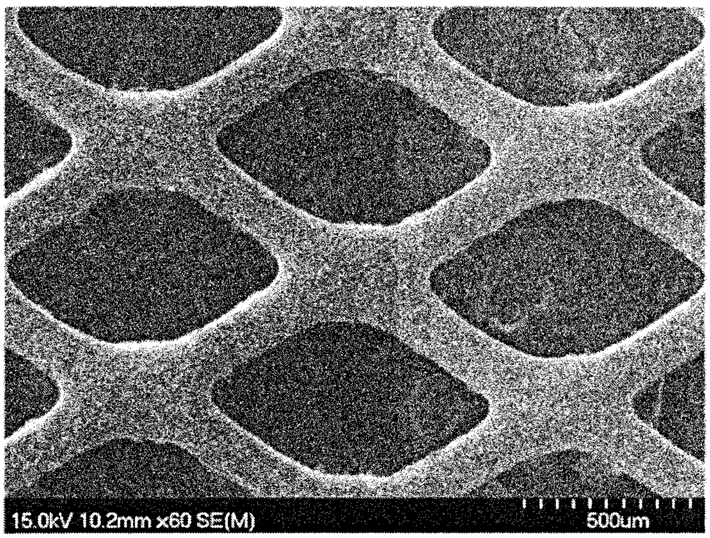
FIGS. 6A-6C are scanning electron micrograph (SEM) images of a thin aluminum mesh onto which aluminum oxide has been grown and a uniform layer of phosphor embedded in glass has been deposited.

Experiments show that the thin encapsulated (or partially encapsulated) phosphor layers form as uniform films over the entire electrode mesh 32, 34, including within the microcavities 30. A scanning electron micrograph (SEM) of a solid (as opposed to wire) aluminum mesh completely covered by a phosphor/glass layer is shown as FIG. 6A. In this example, the mesh was first anodized to grow nanoporous alumina from the metal. After anodization, the phosphor-embedded glass layer was formed over the mesh by methods of the present invention. The mesh of FIG. 6A may serve as one of the electrodes in a microplasma array structure. In this case, a second electrode is required which may be a second mesh or, for example, a continuous metal sheet that has been anodized. By placing the second electrode in close proximity (<1 mm) to the mesh of FIG. 6A, applying an appropriate time-varying voltage between the two electrodes and filling the entire region between and within the electrodes with the desired gas or vapor, an array of microplasmas will be realized.

Figure 6B:
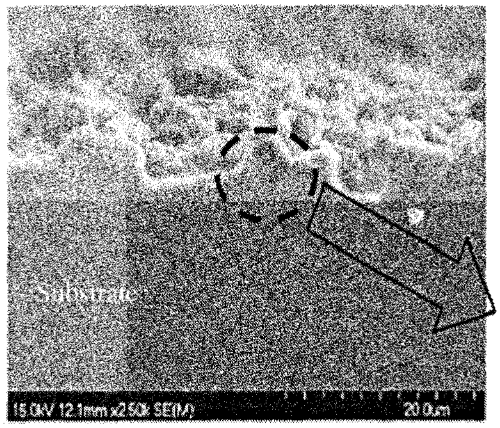
Figure 6C:
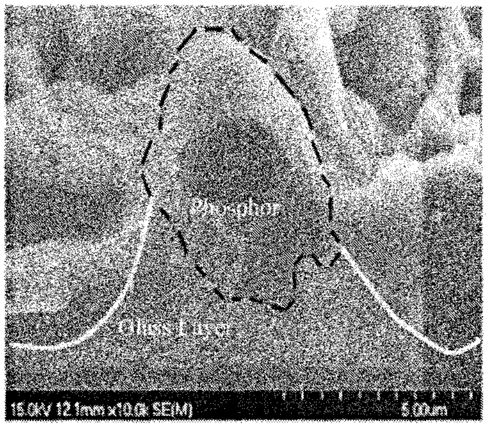
Figure 7A:
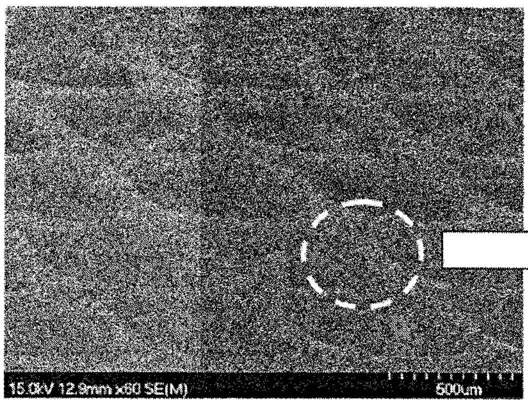
FIGS. 7A and 7B are (SEM) images of an aluminum screen onto which a phosphor/glass layer has been applied.
Figure 7B:
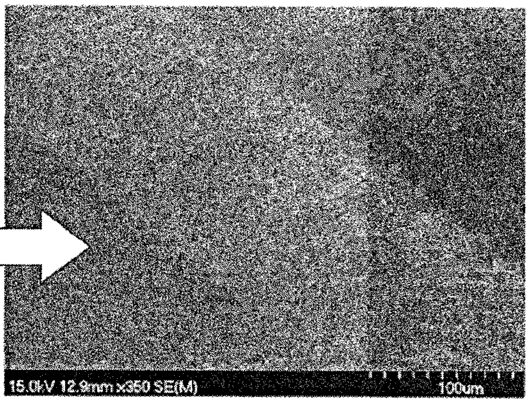

Experiments have shown that the thin glass encapsulated phosphor layers are uniform in thickness and also robust. That is, the phosphor particles are attached firmly to the surface and partially or completely encapsulated in a thin glass layer. Furthermore, the constituents of the glass paste (such as $Al_2O_3$) having a melting point well above the highest temperature employed in the high temperature baking process are not melted. Rather, as described previously, such to particles serve to stabilize the position of a phosphor particle on an inclined or vertically-oriented surface. This provides a phosphor coating that is able to remain stable on an inclined or vertical surface. As best illustrated by the cross-sectional SEM images of FIGS. 6B and 6C, many of the phosphor particles (such as the particle identified by the dashed curves in FIGS. 6B and 6C) are completely encapsulated in a thin layer of glass. This is advantageous for protecting the phosphor particles from the plasma but the thin encapsulated phosphor layers of the invention will find other applications as well. As discussed earlier, fully encapsulating phosphor particles with glass or polymer is not advantageous from an optical perspective if the incoming light (such as VUV photons) is unable to pass through the glass layer. In such an instance, partial encapsulation (FIG. 4) is preferable. The SEM images in FIGS. 7A and 7B show enlarged views of a portion of an aluminum screen having square microcavities. The screen was partially anodized so as to produce a nanoporous alumina layer within which remains an aluminum core. FIG. 7B, in particular, illustrates the uniform coverage of a phosphor-embedded glass layer on the screen, even over those areas where the surface to be covered is vertical. As discussed above, preformed screens and microfabrication techniques provide a wide variety of microcavity shapes and FIGS. 7A and 7B illustrate one example.

The encapsulation of phosphors in a thin layer provides other benefits apart from the protection of the phosphor. Phosphors are problematic from a vacuum and chemical standpoint. As a result of outgassing, phosphors can poison the gas in a microcavity plasma device or a conventional lamp. Partially or fully encapsulating phosphor particles in glass or polymer mitigates this difficulty. The magnified view in FIG. 7B shows the surface of the glass surface to be irregular with phosphor particles embedded partially or fully in the glass layer. In an experimental array, a thin encapsulated phosphor layer included green luminescent phosphor particles. The phosphors were excited by ultraviolet radiation and provided a uniform green luminescence.

While the thin encapsulated phosphor layers have been illustrated with respect to preferred embodiment arrays of microcavity plasma that are based upon thin metal/metal oxide sheets, the layers are generally applicable to almost any application in which phosphors find use. In addition, the thin encapsulated phosphor layers are of value in other types of microcavity plasma devices, such as those formed from semiconductors and ceramic materials.

Figure 8:
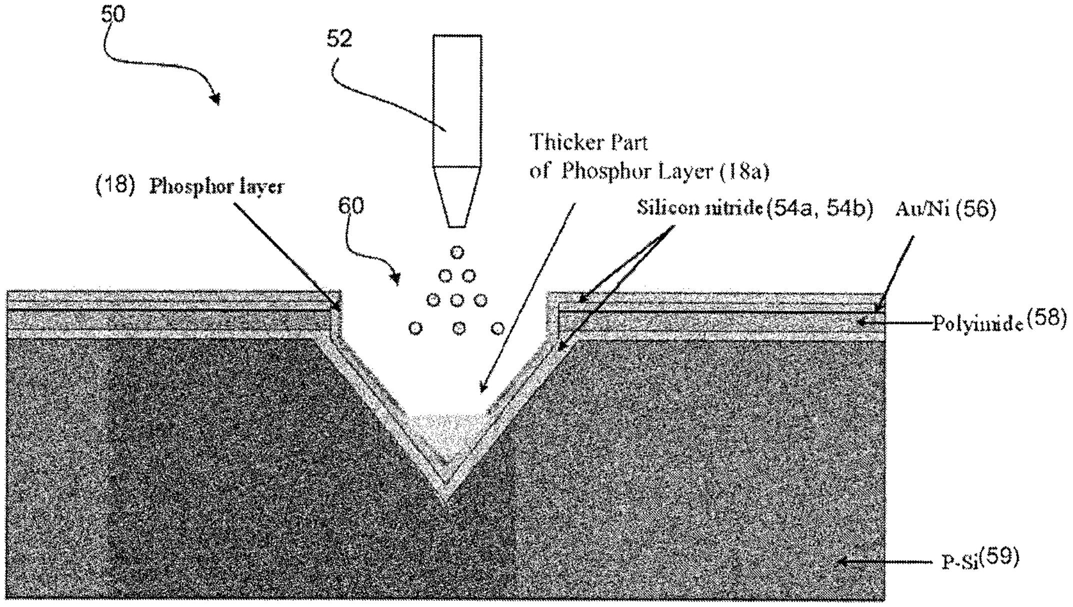
FIG. 8 is a cross-sectional diagram that illustrates a preferred method for depositing phosphor into a pyramidal microcavity fabricated in silicon.

As an example, U.S. Pat. No. 7,112,918 discloses microcavity plasma devices and arrays having tapered microcavities. A preferred device of the invention, based upon a tapered microcavity plasma device of the type in the '918 patent, is shown in FIG. 8. FIG. 8 shows a single microcavity plasma device 50 and schematically illustrates a step of the fabrication method in which a liquid mixture of a phosphor and solvent is deposited as in the process of FIGS. 2A-2E to form a layer with partially or fully embedded phosphor particles on the irregular surface that includes a microcavity 60. A microspray nozzle 52 deposits the glass/polymer as in FIG. 2C, and the subsequent steps form the partially embedded glass/polymer and phosphor layer 18 as in FIGS. 1C, 2D and 2E. In this example embodiment, the glass/polymer and phosphor layer 18 is formed on a thin (top) layer of silicon nitride 54*a* that protects device electrodes 56 formed from a Au/Ni bilayer. A thick layer of polyimide 58 and an additional (bottom) layer 54*b* of silicon nitride provide additional isolation of the electrodes 56 from a p-type silicon substrate 59 that also acts as an electrode to generate a plasma in a microcavity 60 formed in the silicon substrate 59. After spraying of the liquid mixture of phosphor and solvent, heating and optional removal of excess phosphor particles in accordance with FIGS. 1 and 2 results in the thin layer of phosphor particles 18. Additionally, the layer 18 can be overcoated with a thin glass or transparent dielectric layer to completely encapsulate phosphor particles as discussed above. Preferably, the layer 18 is formed to have a thicker portion 18*a* at the bottom of the pyramidal microcavity 60. This helps to make emission more to uniform because the electric field in and around the plasma is weaker at the bottom of the inverted pyramid microcavity 60. The thicker portion 18*a* of the encapsulated phosphor layer increases light output without compromising the electric field distribution in the microcavity. The phosphor layer 18 in FIG. 8 need not be deposited onto the top silicon nitride layer 54. In another embodiment, the top layer of silicon nitride 54*a* is omitted formation of the layer 18 occurs upon the Au/Ni electrode 56 and the microcavity wall in accordance with the processes of FIGS. 1 and 2.

Figure 9:
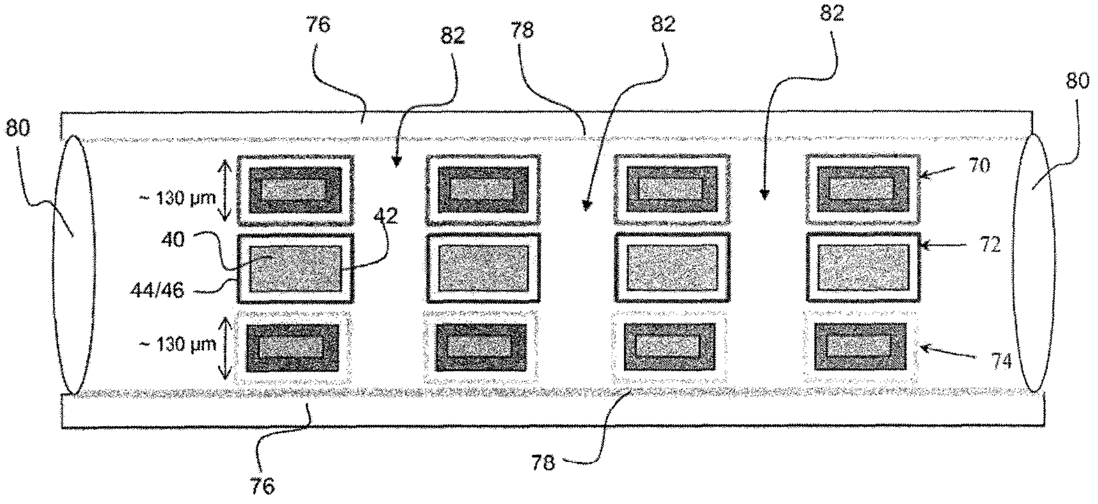
FIG. 9 is a schematic cross-sectional diagram of a preferred embodiment white-emitting light that includes an array of metal/metal oxide microcavity plasma devices having electrodes and a spacer coated with different glass encapsulated phosphor layers.

Additional preferred microcavity plasma device arrays of the invention provide full color displays, specific color displays, or white lamps by use of multiple different colored electrodes or by a pattern of phosphors to produce separate red, green, and green emitting pixels. FIG. 9 a cross-sectional diagram of a white light-emitting lamp having three $Al/Al_2O_3$ respective red, blue and green screens 70, 72 and 74 that each have the structure shown in FIG. 5B, 6A, or 7A and are each coated with a respective red, blue and green thin encapsulated phosphor layer formed according to FIG. 1 or 2 to result in a microcavity array that can produce white light. In the specific structure of FIG. 9, only the red-coated 70 and green-coated 74 meshes serve as electrodes for the microcavity lamp, and the blue-coated screen 72 serves as a spacer to obtain the proper separation between the two electrodes 70 and 74. It is not necessary to electrically "drive" the blue phosphor-coated mesh directly, and it is not critical which color screen serves as the middle spacer layer. The phosphor in whichever screen forms the middle spacer layer 72 will also be excited to luminescence by plasma generated in microcavities of the electrode layers 70 and 74. However, one may electrically drive any two or all of the screens in FIG. 9, if desired. Also, the electrical bias between each of the screens may be varied at will. The primary reason for coating screens in one of the primary colors, as opposed to coating all three with the same white phosphor, is that independent control of the primary colors allows for continuously varying correlated color temperature (CCT) of the lamp from a "cool white" to a "warm" (red rich) white.

The FIG. 9 lamp can produce double-sided emissions when it is packaged with a transparent material 76, such as glass or polymeric packaging. The package 76 can be made of separate or single layers of glass or another material (such as a polymeric package wrap similar to that used in the food industry), and in the example the "white" phosphor 78 (a mixture of red, green, and blue phosphors) is also optionally applied to the separate top and bottom packaging windows. Preferred packaging and formation processes, including roll to roll processing, for completing arrays after the electrode and spacer layers are formed, are disclosed, for example, in Eden et al., U.S. Pat. No. 7,385,350, entitled "Arrays of Microcavity Plasma Devices with Dielectric Encapsulated Electrodes." As disclosed in the '350 patent, selective oxidation of the electrodes 70 and 74 (and 72 as well, if desired) can create addressable arrays.

The white phosphor 78 on the separate top and bottom packaging layers 76 in FIG. 5 can be the same or different thickness on the top and bottom, e.g., typically 5 μm on top and 20 μm at the bottom. In the example device of FIG. 9, the middle spacer screen 72 preferably includes a thicker phosphor layer, e.g. 10 μm, while the phosphor coatings on the top and bottom electrodes are thinner, e.g., 5-7 μm. The spacer layer 72 can be made of a thinner metal mesh and metal oxide, and that permits a substantially thicker phosphor while maintaining a similar overall thickness to the electrode layers 70 and 74. In this way, the middle layer 72 that is further from the transparent material 76 will contribute a similar emission intensity as that generated by the top and bottom electrodes 70 and 74. Another motivation for a thicker phosphor layer on screen 72 is that the efficiency (quantum efficiency) for blue phosphor is lower than that for either red or green phosphors. Example overall thicknesses of the layers 70 and 74 are about 130 μm.

When separate top and bottom packaging layers are used, ends of the array of can be sealed with a sealing agent 80, which may be glass frit or another suitable material. A plasma medium (gas, vapor, or a combination thereof) is enclosed in the array, and plasma is formed in microcavities 82 that extend the full height created by the three layers 70, 72, and 74 when time-varying (AC, RF, bipolar or pulsed DC, etc.) potential is applied between the electrodes 70, 72 and 74 to excite the gaseous or vapor medium to create a microplasma in each is microcavity 82. The device operates at pressures not normally obtainable in macroscopic discharges, and the plasma medium can be produced and readily contained, for example, at pressures up to 1 atmosphere and beyond. This makes the array robust, and permits very thin packaging layers to be used when the difference between the internal pressure in the lamp and 1 atmosphere is small.

Figure 10:
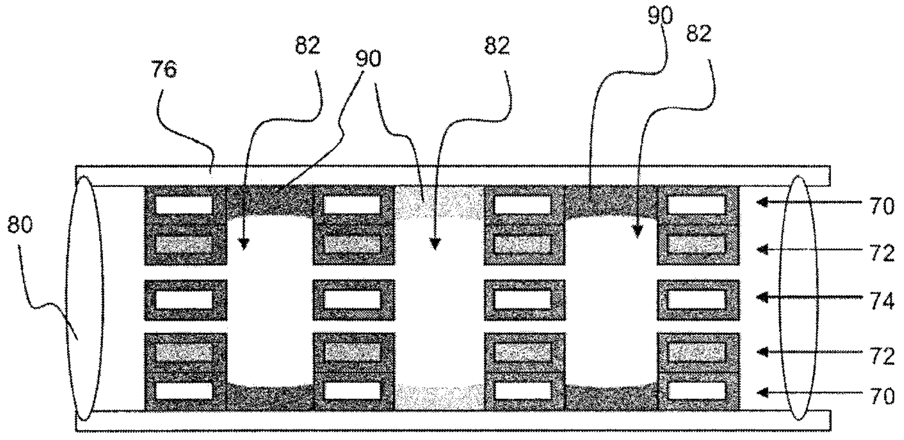
FIG. 10 is a cross-sectional diagram of another preferred embodiment white or specific color emitting light that includes three $Al/Al_2O_3$ screen sections.
Figure 11A:
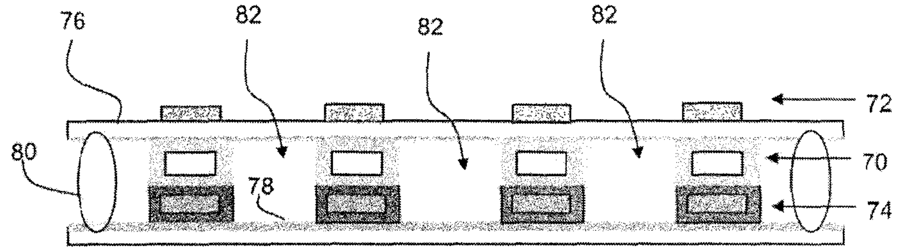
FIGS. 11A and 11B are cross-sectional diagrams of additional preferred embodiment white light or a specific color emitting lights.
Figure 11B:
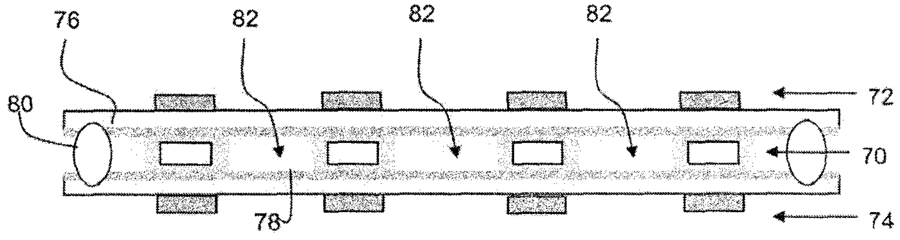

Additional embodiments that are similar to the FIG. 9 embodiment are shown in FIGS. 10 and 11A & 11B and are labeled with reference numbers introduced in FIG. 9. In FIG. 10, multiple spacer layers 72 with thin encapsulated phosphors separate the electrodes 70 and 74 from each other and from the packaging layer 76. The microcavities 82 can be extended in length in this case as compared to FIG. 5. An additional pattern of glass encapsulated phosphor 90 is formed in individual microcavities 82, and the pattern can include different color, glass-encapsulated phosphors in different microcavities, for example, to form a color pixel. Although the thickness of phosphor layer 90 appears in FIG. 10 to be thicker than that elsewhere, this need not be so. For lamp applications, the thickness of phosphor layer 90 at the rear of the lamp (bottom of FIG. 10) may be larger than at the front of the lamp in order to promote the extraction of light from the front of the lamp. In FIGS. 11A and 11B, one or both of the electrode layers 74 and 72 is formed externally to the packaging layers 76 and the phosphor coating on screen 70 may be a single color (e.g., primary color) or a mixture of colors. Also, the electrodes 72 and 74 need not be anodized as suggested by FIG. 11. Whether internal or external to the lamp packaging, the electrodes may be anodized but may also be a polymer covered (or coated) mesh or, simply, a patterned metal electrode.

Figures 2A, 2B, 2C, 2D, 2E:
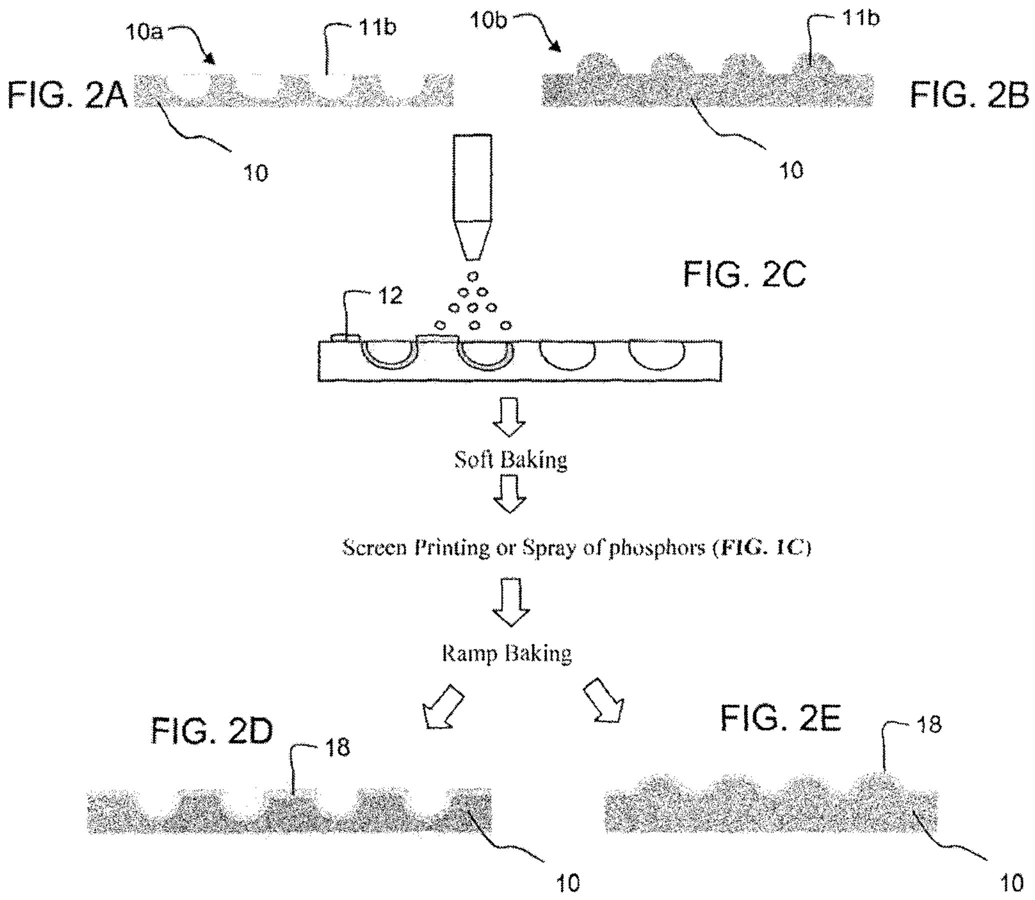
FIGS. 2A-2E illustrates an example application of the FIGS. 1A-1E process to form a thin layer of phosphor particles, each partially or fully encapsulated, within an array of microcavities or onto an array of surface protrusions.
Figure 12A:
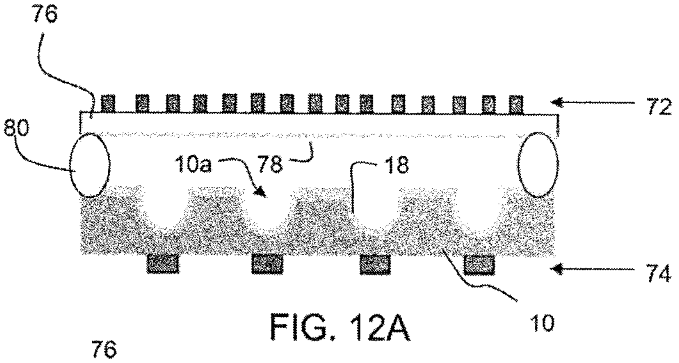
FIGS. 12A-12C are cross-sectional diagrams of three preferred embodiment lamps include phosphor layers embedded in glass or anchored in a metal layer.
Figure 12B:
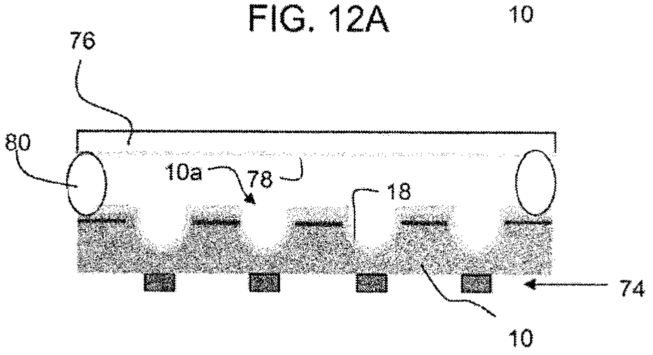
Figure 12C:
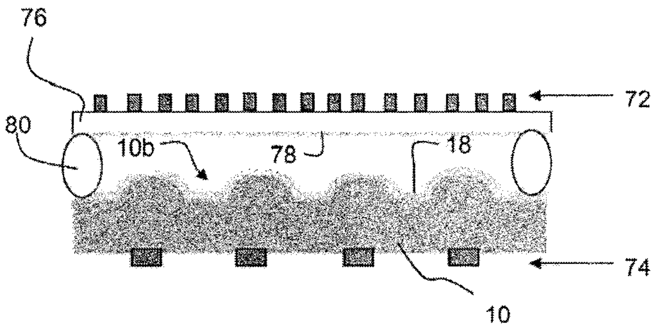

FIGS. 12A-12C illustrates several lamps that include the phosphor-coated, structured surfaces of FIGS. 2D and 2E to serve as a portion of the lamp. Electrodes can be arranged as in FIGS. 11A and 11B and are labeled with the same reference numbers. FIGS. 12A and 12B include a substrate 10 with the irregular surface 10*a* of FIGS. 2A and 2D, while the lamp of FIG. 12C includes a substrate 10 with the irregular surface of FIGS. 2B and 2E. The lamps in FIGS. 12A and 12C include two external electrodes 72, 74 as in FIGS. 11A and 11B, while the lamp of FIG. 12B includes a thin metal layer electrode 28 as in FIG. 4A and 4B. The lamps are sealed with packaging layers and additional phosphors as shown in FIGS. 11A-11C.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A thin phosphor coating on a substrate, comprising:
a glass film having a substantially uniform thickness of ~1-~20 μm;
phosphor particles having diameters in the range of ~1-~10 μm, the phosphor particles being at least partially encapsulated by the glass film.

2. The coating of claim 1, wherein at least some of the phosphor particles are completely encapsulated by the glass film.

3. The coating of claim 2, wherein substantially all of the phosphor particles are completely encapsulated by the glass film.

4. The coating of claim 1, wherein said phosphor particles comprise particles having a diameter of ~5 μm.

5. A microcavity plasma device, comprising:
a microcavity isolated from driving electrodes by dielectric; and
a coating in accordance with claim 1 formed on the dielectric.

6. The device of claim 5, comprising a plurality of microcavities forming an array, wherein:
the driving electrodes comprise thin metal sheets or screens having openings that define the microcavities;

the dielectric comprises metal oxide formed upon the thin metal sheets or screens.

7. The device of claim 6, comprising:

at least three thin metal sheets or screens, a middle one of the at least three thin metal sheets or screens not being driven to act as a spacer: and wherein the coating comprises at least three different colored phosphors on the respective at least three thin metal sheets or screens.

8. The device of claim 7, further comprising packaging enclosing the array.

9. The device of claim 8, wherein one of the at least three thin metal sheets or screens is external to said packaging.

10. The device of claim 9, wherein two of the at least three thin metal sheets or screens is external to said packaging and the middle one of the at least three thin metal sheets or screens is internal to said packaging.

11. The device of claim 7, wherein the coating on the middle one of the at least three thin metal sheets or screens is thicker than the coating on the other ones of the at least three thin metal sheets or screens.

12. The coating of claim 1, wherein the phosphor particles consist of particles having diameters in the range of ~1-~10 μm.

13. The coating of claim 1, wherein the glass comprises a mixture of $B_2O_3$, MgO, ZnO, $TiO_2$,$Al_2O_3$, $SiO_2$ and $Bi_2O_3$.

14. The coating of claim 1, wherein the glass comprises a glass formed from a glass paste having a viscosity of 500-1000 centipoise.

15. A thin phosphor coating on a substrate, comprising:

a glass or polymer film having a substantially uniform thickness of ~1-~20 μm;

phosphor particles having diameters in the range of ~1-~10 μm, the phosphor particles being at least partially encapsulated by the glass or polymer film, wherein the substrate comprises and irregular surface.

16. The coating of claim 15, wherein the irregular surface includes inclines and/or microstructures.

17. The coating of claim 15, wherein the irregular surface comprises a dielectric surface.

18. A thin phosphor coating on a substrate, comprising:

a thin metal layer formed of low melting point metal or metal alloy;

a substantially uniform layer of phosphor particles having diameters in the range of ~1-~10 μm, the phosphor particles being anchored into the thin metal layer.

19. The coating of claim 18, wherein the metal layer is ~2 μm or less thick.

20. The coating of claim 18, wherein the low melting point metal comprises one of In, Tl, Pb, Sn, or Zn.

21. The coating of claim 18, further comprising a glass or polymer film that partially encapsulates the phosphor particles.

22. The coating of claim 18, wherein the substantially uniform layer of phosphor particles consists of particles having diameters in the range of ~1-~10 μm.

23. A thin coating on a substrate, comprising:

a glass or polymer film having a substantially uniform thickness of ~1-~10 μm;

phosphor particles having diameters in the range of ~1-~10 μm, the phosphor particles being at least partially encapsulated by the glass or polymer film.

* * * * *